United States Patent
Bonwick et al.

(10) Patent No.: US 7,469,320 B2
(45) Date of Patent: Dec. 23, 2008

(54) ADAPTIVE REPLACEMENT CACHE

(75) Inventors: Jeffrey S. Bonwick, Los Altos, CA (US); William H. Moore, Fremont, CA (US); Mark J. Maybee, Boulder, CO (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 286 days.

(21) Appl. No.: 11/417,078

(22) Filed: May 3, 2006

(65) Prior Publication Data
US 2007/0106846 A1 May 10, 2007

Related U.S. Application Data

(60) Provisional application No. 60/733,403, filed on Nov. 4, 2005.

(51) Int. Cl.
G06F 12/00 (2006.01)
(52) U.S. Cl. ...................................................... 711/133
(58) Field of Classification Search .................. 711/133
See application file for complete search history.

(56) References Cited

U.S. PATENT DOCUMENTS

| 6,678,793 | B1 * | 1/2004 | Doyle .......................... 711/133 |
| 6,681,298 | B1 * | 1/2004 | Tso et al. ..................... 711/133 |
| 6,684,299 | B2 * | 1/2004 | Hetherington et al. ...... 711/140 |
| 2001/0034814 | A1 * | 10/2001 | Rosenzweig ................. 711/118 |
| 2003/0004882 | A1 | 1/2003 | Holler et al. |

* cited by examiner

*Primary Examiner*—Tuan V. Thai
*Assistant Examiner*—John P Fishburn
(74) *Attorney, Agent, or Firm*—Osha · Liang LLP

(57) ABSTRACT

A method for caching a block, which includes receiving a request to store the block in a cache and determining whether the cache is able to expand. If the cache is not able to expand, then determining whether evictable blocks are present in the cache and, if evictable blocks are present in the cache determining whether a total size of the evictable blocks is greater than or equal to a size of the block, evicting a sufficient number of the evictable blocks from the cache and storing the block in the cache, if the total size of the evictable blocks is greater than or equal to the size of the block, and activating a cache throttle, if the total size of the evictable blocks is less than the size of the block.

9 Claims, 3 Drawing Sheets

ADAPTIVE REPLACEMENT CACHE

CROSS REFERENCE TO RELATED APPLICATIONS

This application claims benefit of U.S. Provisional Application Ser. No. 60/733,403 filed on Nov. 4, 2005, entitled "Adaptive Replacement Cache and Compressed Victim Cache" in the names of Jeffrey S. Bonwick, William H. Moore, Mark J. Maybee, and Matthew A. Ahrens.

BACKGROUND

Traditional systems include a processor, a L1 cache, a L2 cache, and memory. The L1 cache is a form of fast memory (holding recently accessed data), designed to speed up subsequent access to the same data. The L1 cache, specifically, is located on or close to the microchip containing the processor. The L2 cache is similar to the L1 cache except that it contains data that was not as recently accessed as the data in the L1 cache. Additionally, the L2 cache typically has a larger memory capacity and a slower access time.

The memory is typically random access memory (RAM). When a load request is generated on the system, a virtual address is sent from the processor to a corresponding TLB (not shown). The TLB converts the virtual address into a physical address that is subsequently sent to the L1 cache. In one embodiment of the invention, associated with the L1 cache is an L1 cache tag array. The L1 cache tag array is an index of data stored in the L1 cache. If the physical address, sent from the TLB to the L1 cache, is present in the L1 cache tag array, then the datum corresponding to the physical address is retrieved and sent to the processor. If the physical address is not present in the L1 cache tag array, then the L1 cache forwards the physical address to the L2 cache.

If the physical address is found in the L2 cache tag array, then a cache line associated with the physical address is retrieved from the L2 cache and sent to the L1 cache. One skilled in the art will appreciate that the cache line is the unit of transfer between the L2 cache and the L1 cache. Once the L1 cache receives the cache line, the L1 cache retrieves and forwards the requested datum within the cache line to the processor.

If the physical address is not found in the L2 cache tag array, then the L2 cache forwards the physical address to memory. Once the physical address is found in memory, the entire cache line on which the requested datum is located is retrieved and sent to the L2 cache. The L2 cache subsequently forwards the entire cache line to the appropriate L1 cache. Upon receipt of the entire cache line, the L1 cache forwards the requested datum within the cache line to the appropriate processor.

Each of the aforementioned caches (i.e., L1 cache and L2 cache) has a fixed size. Accordingly, a cache may become full (i.e., no more data may be stored in the cache). When a cache becomes full, one or more cache lines must be evicted, prior to loading additional data into the cache.

SUMMARY

In general, in one aspect, the invention relates to a method for caching a block, comprising receiving a request to store the block in a cache, determining whether the cache is able to expand, if the cache is able to expand: expanding the cache to obtain an expanded cache, and storing the block in the expanded cache, if the cache is not able to expand: determining whether evictable blocks are present in the cache; if evictable blocks are present in the cache: determining whether a total size of the evictable blocks is greater than or equal to a size of the block, evicting a sufficient number of the evictable blocks from the cache and storing the block in the cache, if the total size of the evictable blocks is greater than or equal to the size of the block, and activating a cache throttle, if the total size of the evictable blocks is less than the size of the block.

In general, in one aspect, the invention relates to a system, comprising a cache, wherein the cache is configured to: receive a request to store a block, determine whether the cache is able to expand, if the cache is able to expand: expand the cache to obtain an expanded cache, and store the block in the expanded cache, if the cache is not able to expand: determine whether evictable blocks are present in the cache, if evictable blocks are present in the cache: determine whether a total size of the evictable blocks is greater than or equal to a size of the block, evict a sufficient number of the evictable blocks from the cache and store the block in the cache, if the total size of the evictable blocks is greater than or equal to the size of the block, and activate a cache throttle, if the total size of the evictable blocks is less than the size of the block.

Other aspects of the invention will be apparent from the following description and the appended claims.

DESCRIPTION

Figure 1:
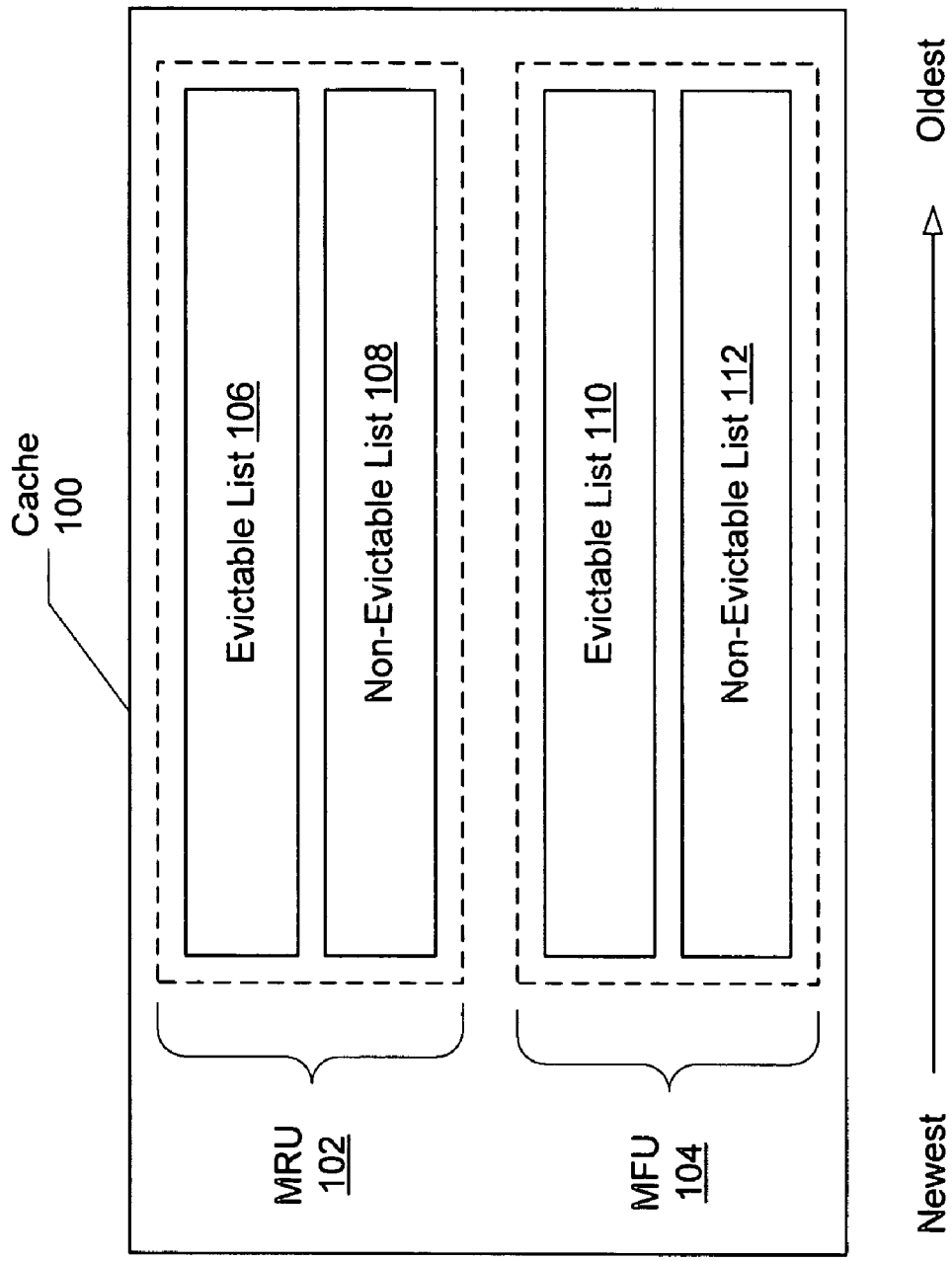
FIG. 1 shows a cache in accordance with one embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to block caching. More specifically, embodiments of the invention relate to improvements in the caching mechanisms using an adaptive replacement cache policy and/or a compressed victim cache. Various embodiments of the invention are discussed below.

FIG. 1 shows a cache in accordance with one embodiment of the invention. More specifically, FIG. 1 shows the structure of a cache implementing the adaptive replacement cache (ARC) mechanism (discussed in FIG. 1). In one embodiment of the invention, the cache shown in FIG. 1 may correspond to a L1 cache, an L2 cache, or any other type of cache.

As shown in FIG. 1, the cache (100) includes two portions: a Most Recently Used (MRU) portion (102) and a Most Frequently Used (MFU) portion (104). In one embodiment of the invention, the MRU portion (102) of the cache (100) is configured to store blocks (i.e., a block of data) that have (or had at one time) at most one active reference (i.e., there is (or was) another block referencing the block). In contrast, the MFU portion (104) of the cache (100) is configured to store blocks that have (or had at one time) two or more active references.

Each of the aforementioned portions of the cache (100) is sub-divided into two sub-portions: evictable (106, 110) and non-evictable (108, 112). In one embodiment of the invention, the evictable sub-portions (106, 110) of the cache (100) include blocks that have no active references. In contrast, the non-evictable sub-portions (108, 112) of the cache (100) includes blocks that have one or more active references (depending on whether the non-evictable sub-portion corresponds is associated with the MRU portion (102) or the MFU portion (104) of the cache).

Blocks in the evictable sub-portion (106, 110) may be moved to the non-evictable sub-portion (108, 112), if the block is subsequently referenced (i.e., there is an active reference to the block). Similarly, blocks in the non-evictable sub-portion (108, 112) may be moved to the evictable sub-portion (106, 110), if all active references to the block subsequently become inactive.

In one embodiment of the invention, each portion of the cache (i.e., the MRU portion (102) and the MFU portion (104)) maintain the blocks within the sub-portions using linked-lists. Further, in one embodiment of the invention, the blocks in the linked list are organized from newest (i.e., most recently moved to the sub-portion) to oldest (i.e., oldest block in the sub-portion). Thus, in one embodiment of the invention, the head pointer for each of the linked lists points the newest block in the sub-portion and the tail of the linked list is the oldest block in the sub-portion.

Those skilled in the art will appreciate that other data structures, instead of linked lists, may be used to organize the blocks in each of the sub-portions. Further, those skilled in the art will appreciate that one or more of the caches (L1, L2, etc) may implement the data structure shown in FIG. 1.

In one embodiment of the invention, one or more of the caches shown in FIG. 1 may be expanded (i.e., the size of the cache may be increased at run-time) or reduced (i.e., the size of the cache is decreased at run-time). Further, in one embodiment of the invention, the size of the blocks in each of the caches is variable, for example, between 512 bytes and 128K.

Figure 2:
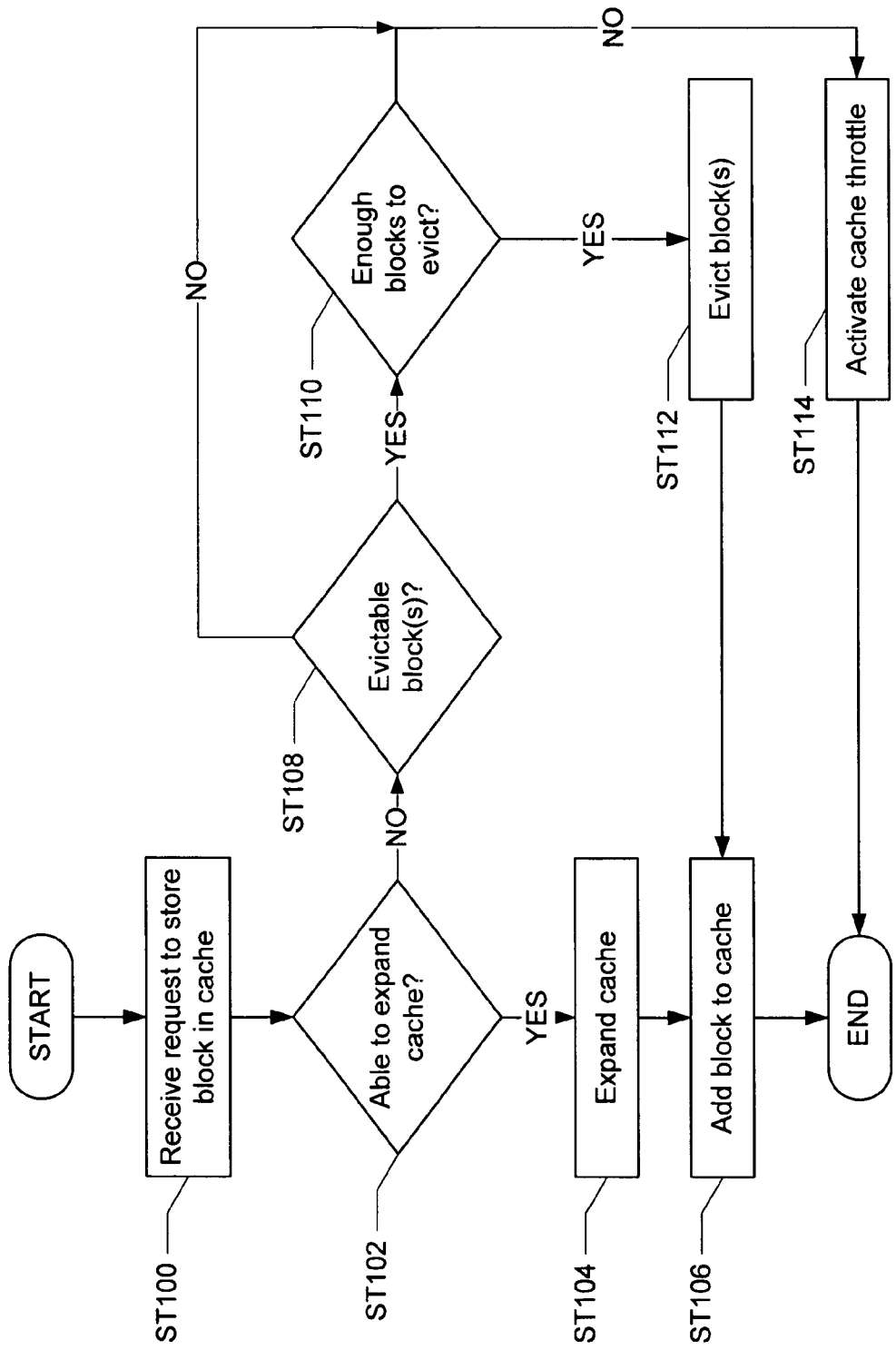
FIG. 2 shows a flowchart in accordance with one embodiment of the invention.

FIG. 2 shows a flowchart in accordance with one embodiment of the invention. More specifically, FIG. 2 shows a flowchart describing the operation of the cache shown in FIG. 1 in accordance with one embodiment of the invention. Initially, a request is received by the cache to store a block (ST100). A determination is then made about whether the cache may be expanded (ST102). In one embodiment of the invention, the determination of whether to expand the cache is made based on the memory state (e.g., low memory, high memory). The memory state may be ascertained, for example, from a process that is concurrently monitoring of the system to determine whether the system is paging, low on swap, low on kernel heap space, etc. Typically, if the memory state is low, then the cache cannot be expanded.

In one embodiment of the invention, if memory state is low, the cache is signaled not to expand. Further, various processes in the system configured to decrease the size of the cache may also be activated at this time. Such processes may run in the background until the memory state is no longer low.

Continuing with the discussion of FIG. 2, if the cache can be expanded, the cache is expanded to store the block (ST104) and the block is subsequently stored in the cache in the appropriate portion and sub-portion (ST106). However, if the cache cannot be expanded, then a determination is made about whether any evictable blocks exist (i.e., are there any blocks on either of the evictable lists) (ST108). If there are blocks to evict, a subsequent determination is made about whether there are enough blocks to evict (ST100). As discussed above, the cache supports multi-block sizes, thus, a determination must be made about whether a sufficient number of blocks may be evicted from the cache, such that there is space to store the new block (i.e., the block requested to be stored in ST100).

If there are enough blocks to evict, then a sufficient number of blocks are evicted from the cache (ST112). In one embodiment of the invention, the blocks on the MRU evictable list are evicted before the blocks on the MFU evictable list. Thus, the cache first attempts to make space for the new block by evicting blocks on the MRU evictable list. If all the blocks on the MRU evictable list have been evicted and sufficient space has not been freed by the eviction of all the blocks on the MRU evictable list, then the cache proceeds to evict blocks on the MFU evictable list until sufficient space has been freed to store the new block.

Continuing with FIG. 2, once the block(s) have been evicted, the new block is added to the cache in the appropriate portion and sub-portion (as discussed above in FIG. 1) (ST106). However, if no evictable blocks exist or there is an insufficient number of evictable blocks (i.e., eviction of all the evictable blocks in the cache will not free up sufficient space to store the new block), then the method proceeds to activate a cache throttle (ST114). In one embodiment of the invention, the cache throttle corresponds to one or more processes executing in the system that attempt to decrease the number of requests to store blocks in the cache. Once the cache throttle has been activated, the method ends and the block is not stored in the cache.

Those skilled in the art will appreciate that one or more of the caches (e.g., L1, L2, etc.) may implement the method shown in FIG. 2.

Figure 3:
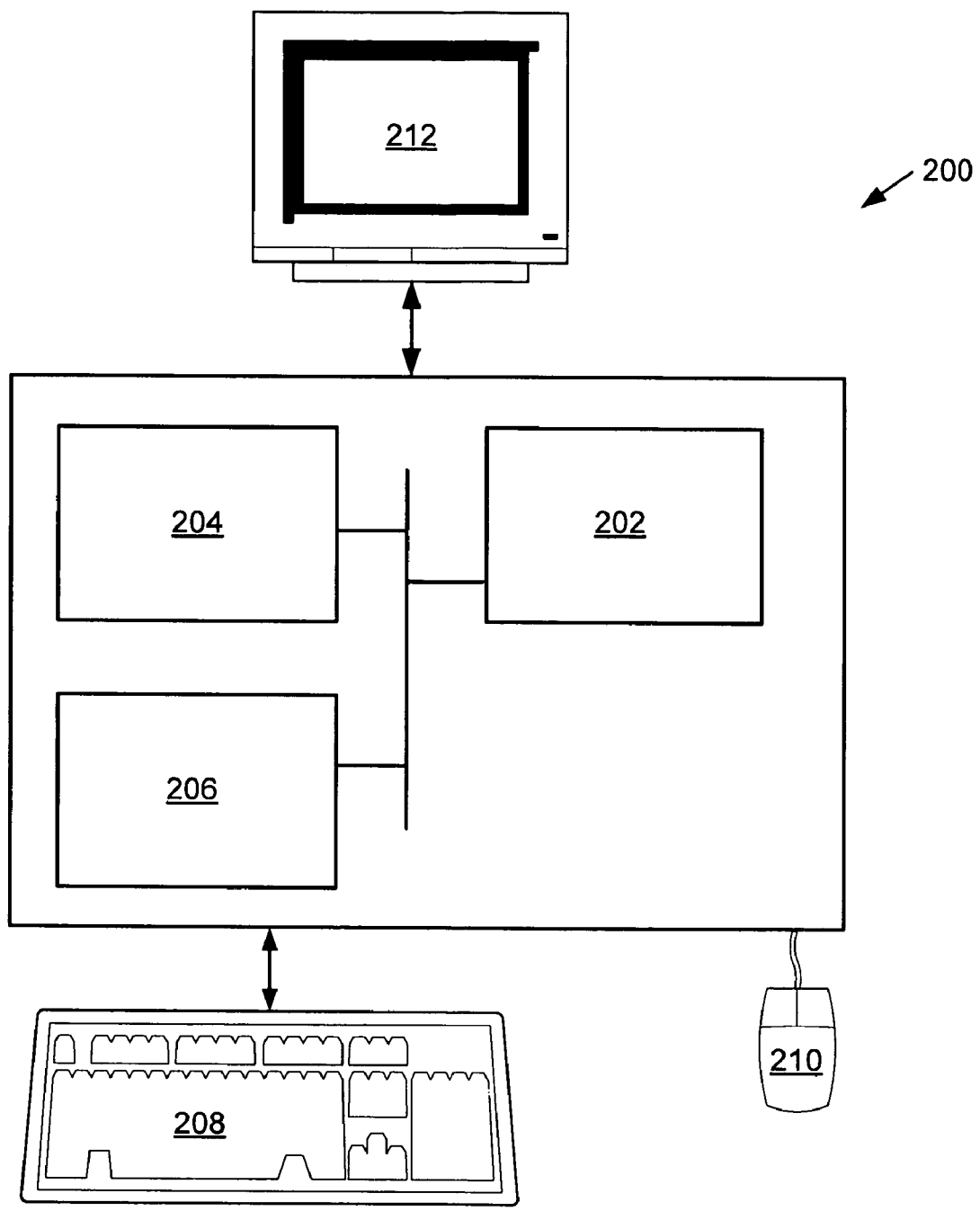
FIG. 3 shows a computer system in accordance with one embodiment of the invention.

The invention may be implemented on virtually any type of computer regardless of the platform being used. For example, as shown in FIG. 3, a networked computer system (200) includes a processor (202), associated memory (204), a storage device (206), and numerous other elements and functionalities typical of today's computers (not shown). The networked computer (200) may also include input means, such as a keyboard (208) and a mouse (210), and an output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, software instructions to perform embodiments of the invention may be stored on a computer readable medium such as a compact disc (CD), a diskette, a tape, a file, or any other computer readable storage device.

Further, those skilled in the art will appreciate that one or more elements of the aforementioned computer (200) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory.

What is claimed is:

1. A method for caching a block, comprising:
receiving a request to store the block in a cache, wherein the cache is structured to comprise a most recently used (MRU) portion and a most frequently used (MFU) portion, wherein the MRU portion comprises a first evictable list and a first non-evictable list, and the MFU portion comprises a second evictable list and a second non-evictable list, wherein the first and second evictable lists are linked lists that store blocks that have no active references and the first and second non-evictable lists are linked lists that store blocks that have at least one active reference;

determining whether the cache is able to expand;

if the cache is able to expand:
    expanding the cache at runtime to obtain an expanded cache, wherein expanding the cache comprises increasing the size of the cache, and
    storing the block in the expanded cache;

if the cache is not able to expand:
    determining whether evictable blocks are present in the cache;
    if evictable blocks are present in the cache:
        determining whether a total size of the evictable blocks is greater than or equal to a size of the block;
        evicting a sufficient number of the evictable blocks from the cache and storing the block in the cache, if the total size of the evictable blocks is greater than or equal to the size of the block; and
        activating a cache throttle, if the total size of the evictable blocks is less than the size of the block.

2. The method of claim 1, wherein blocks in each of the linked lists are organized from newest to oldest.

3. The method of claim 1, wherein the cache supports multiple block sizes.

4. The method of claim 1, wherein determining whether to expand the cache comprises determining whether a memory state of a system in which the cache resides is low.

5. The method of claim 1, wherein evicting the sufficient number of the evictable blocks from the cache comprises:
    evicting evictable blocks in the MRU portion of the cache; and
    evicting evictable blocks in the MFU portion of the cache only if the sufficient number of evictable blocks is not present in the MRU.

6. A system, comprising:
a cache structured to comprise a most recently used (MRU) portion and a most frequently used (MFU) portion, wherein the MRU portion comprises a first evictable list and a first non-evictable list, and the MFU portion comprises a second evictable list and a second non-evictable list, wherein the first and second evictable lists are linked lists that store blocks that have no active references and the first and second non-evictable lists are linked lists that store blocks that have at least one active reference, wherein the cache is configured to:
    receive a request to store a block;
    determine whether the cache is able to expand;
    if the cache is able to expand:
        expand the cache at runtime to obtain an expanded cache, wherein expanding the cache comprises increasing the size of the cache, and
        store the block in the expanded cache;
    if the cache is not able to expand:
        determine whether evictable blocks are present in the cache;
        if evictable blocks are present in the cache:
            determine whether a total size of the evictable blocks is greater than or equal to a size of the block;
            evict a sufficient number of the evictable blocks from the cache and store the block in the cache, if the total size of the evictable blocks is greater than or equal to the size of the block; and
            activate a cache throttle, if the total size of the evictable blocks is less than the size of the block.

7. The system of claim 6, wherein the blocks in each of the linked lists are organized from newest to oldest.

8. The system of claim 6, wherein a size of the block is within a range of 512 bytes and 128 K.

9. The system of claim 6, wherein determining whether to expand the cache comprises determining whether a memory state of a system in which the cache resides is low.

* * * * *